United States Patent
Deligianni et al.

(10) Patent No.: US 9,263,714 B2
(45) Date of Patent: Feb. 16, 2016

(54) POWER SOURCE ENCAPSULATION

(71) Applicant: International Business Machines Corporation, Armonk, NY (US)

(72) Inventors: Hariklia Deligianni, Tenafly, NJ (US); Dimitri Kanevsky, Ossining, NY (US); Nina Sainath, Philadelphia, PA (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/903,601

(22) Filed: May 28, 2013

(65) Prior Publication Data

US 2014/0356699 A1 Dec. 4, 2014

(51) Int. Cl.
H01M 2/04 (2006.01)
H01M 2/10 (2006.01)
H01R 13/66 (2006.01)

(52) U.S. Cl.
CPC ............ *H01M 2/046* (2013.01); *H01M 2/1094* (2013.01); *H01R 13/6675* (2013.01); *Y10T 29/4911* (2015.01)

(58) Field of Classification Search
CPC ...... Y10T 29/4911; H01M 2/06; H01M 2/08; H01M 2/30; H01M 2/34; H01M 2/1094
USPC ........................................................ 429/180
See application file for complete search history.

(56) References Cited

U.S. PATENT DOCUMENTS

| 4,366,213 | A | 12/1982 | Tamminen |
| 5,400,211 | A * | 3/1995 | Evans ............................ 361/502 |
| 6,208,741 | B1 | 3/2001 | Shennib et al. |
| 6,828,060 | B2 | 12/2004 | Zavilenski |
| 2011/0097623 | A1* | 4/2011 | Marinis et al. ................. 429/163 |
| 2011/0293997 | A1* | 12/2011 | Tartaglia ....................... 429/159 |

FOREIGN PATENT DOCUMENTS

| CN | 202050000 U | 11/2011 |
| JP | 51104537 A | 9/1976 |
| JP | 54147429 A | 11/1979 |
| JP | S5942765 A | 3/1984 |
| JP | S614154 A | 1/1986 |

OTHER PUBLICATIONS

K. Lim et al., "Battery Compartment Cover Made of Rubber," IPCOM000193491D, www.ip.com, Mar. 11, 2010, 2 pages.
K. Woznicki, "Swallowing Batteries a Growing Risk for Kids: Increase in Battery Ingestion Linked to Increased Use of Lithium Cell Batteries," http://children.webmd.com/news/20100524/swallowing-of-batteries-a-growing-risk-for-kids, May 24, 2010, 3 pages.

* cited by examiner

*Primary Examiner* — Stewart Fraser
(74) *Attorney, Agent, or Firm* — Jeff Tang; Ryan, Mason & Lewis, LLP

(57) ABSTRACT

A system includes a power source having a set of power terminals, a cover encapsulating the power source including the set of power terminals and sealing the power source including the set of power terminals within the cover, and a set of conductive contacts passing through the cover, contacting the set of power terminals, and providing conductive access to the set of power terminals of the power source from outside the cover without allowing exposure of the power source to an environment outside the cover.

16 Claims, 2 Drawing Sheets

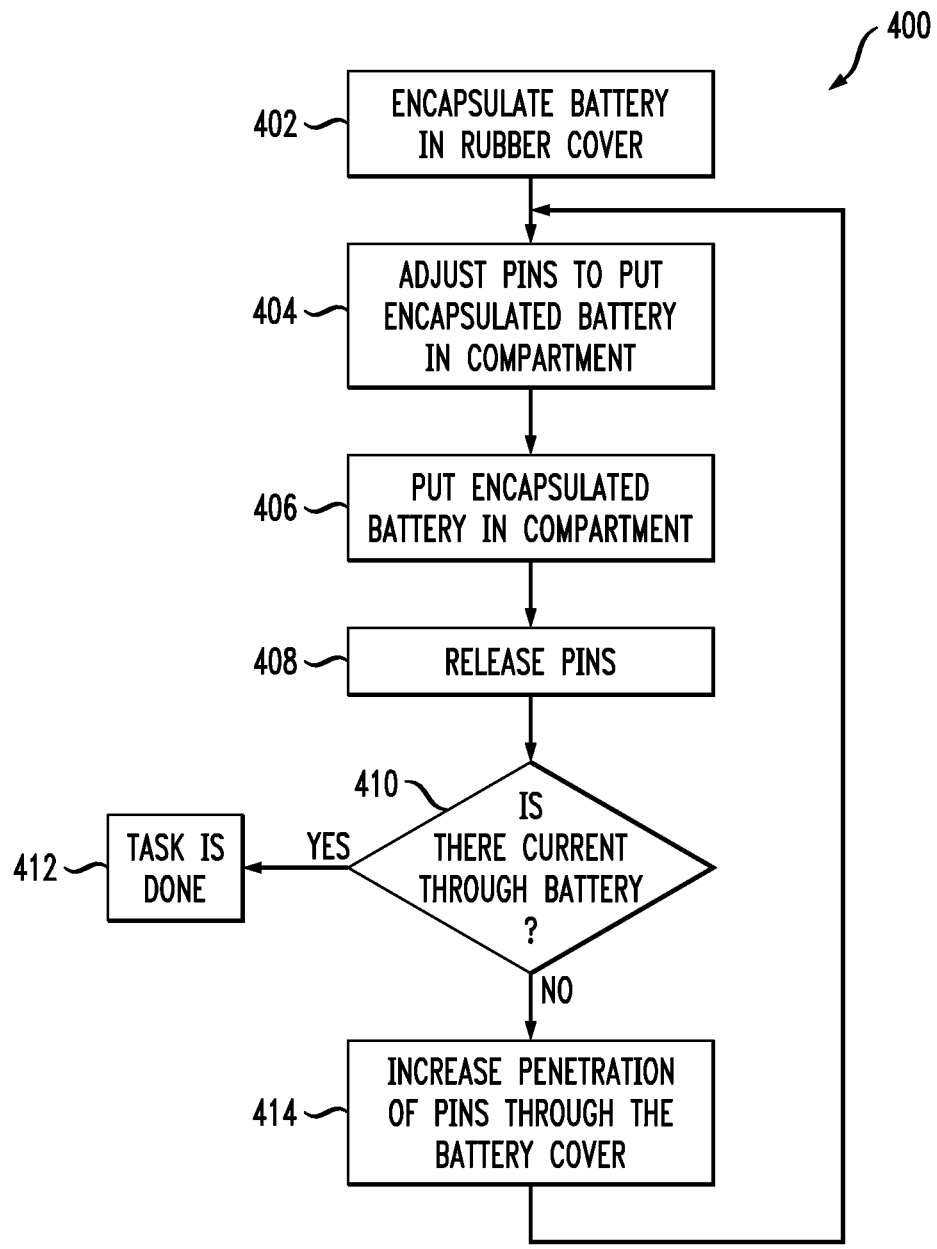

POWER SOURCE ENCAPSULATION

FIELD

The present application relates to batteries and, more particularly, to techniques and mechanisms for encapsulating a power source such as a battery to prevent harm to humans, animals and/or the environment.

BACKGROUND

It has been noticed that there has been a significant increase in the incidents of children swallowing batteries. For example, as suggested in the article K. Woznicki, "Increase in Battery Ingestion Linked to Increased Use of Lithium Cell Batteries," published on the WebMD™ (WebMD LLC) website, May 24, 2010, the widespread use of button and cylindrical type batteries in household electronics and children's toys, particularly lithium cell batteries, is to blame for the increase in battery ingestion. One main concern with battery ingestion by a child is that the battery becomes lodged in the esophagus and, if not removed within a short time period (e.g., two hours), this can cause tissue tears, burning, and internal bleeding.

Another problem with batteries is battery leakage. When batteries are left in an electronic device for a long period of time, acid or alkaline can leak through the battery case and damage the electronic device. These chemicals can also be harmful to humans and animals that come in contact with them, e.g., causing damage to eyes or open wounds. Chemical leakage can also be a danger during battery ingestion.

If batteries are not disposed of correctly, this can also greatly harm the environment. The safe disposal of batteries is not only important to the environment but to humans and animals as well. A battery takes chemical energy and converts it to electrical energy whereby the chemical by-products are (or can become) hazardous. If the batteries are left in the environment, the chemicals can drain out and leech into water supplies and the like, causing people and animals to be exposed to the hazardous chemicals.

The amount of chemicals and or metals in batteries can be staggering. For example, it is known that a car battery contains almost 20 pounds of lead, and about 16 ounces of sulfuric acid. Some car repair shops will take possession of old car batteries. Likewise, mercury and silver oxide batteries can be disposed of at some jewelry stores and pharmacies. Some companies even buy used batteries and recycle the metals. Unfortunately, a large majority of batteries are not disposed of in this safe manner.

The metals and chemicals found in batteries can leach into soil and then into municipal water supplies. When ingested, the metals are hazardous to humans, plants and animals. The metals reach the plant through the root system of the plant. Children are the most susceptible to the metals and chemicals in batteries, which can damage their central nervous system, and cause seizures, learning disabilities and mental defects.

There is thus a need to reduce the risk of harm caused by batteries when they are swallowed by people, and when they are not disposed of properly.

SUMMARY

Embodiments of the invention provide techniques and mechanisms for encapsulating a power source (e.g., a battery) to prevent harm to humans, animals and/or the environment.

For example, in one embodiment, a system comprises: a power source having a set of power terminals; a cover encapsulating the power source including the set of power terminals and sealing the power source including the set of power terminals within the cover; and a set of conductive contacts passing through the cover, contacting the set of power terminals, and providing conductive access to the set of power terminals of the power source from outside the cover without allowing exposure of the power source to an environment outside the cover.

In another embodiment, an apparatus comprises: a battery having positive and negative power terminals; a rubber cover encapsulating the battery including the positive and negative power terminals and sealing the battery including the positive and negative power terminals within the cover; and a set of conductive contacts passing through the rubber cover, contacting the positive and negative power terminals, and providing conductive access to the positive and negative power terminals of the battery from outside the rubber cover without allowing exposure of the battery to an environment outside the cover; wherein the rubber cover is configured to re-seal upon removal of one or more of the positive and negative conductive contacts.

In a further embodiment, a method comprises: encapsulating a power source including a set of power terminals in a cover and sealing the power source including the set of power terminals within the cover; and inserting a set of conductive contacts through the cover to contact the set of power terminals and provide conductive access to the set of power terminals of the power source from outside the cover without allowing exposure of the power source to an environment outside the cover.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 4 illustrates a methodology for forming and installing an encapsulated battery system, according to an embodiment of the invention.

DETAILED DESCRIPTION

Illustrative embodiments of the invention will be described below in the context of a battery. However, it is to be understood that the encapsulation techniques and mechanisms described herein are more generally applicable to any power source for which it would be desirable to prevent harmful chemical leakage, reduce harm caused by ingestion, and/or other related harms caused by the power source and its components.

Figure 1:
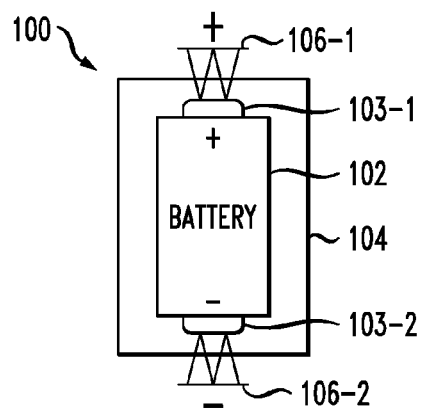
FIG. 1 illustrates an encapsulated battery system, according to an embodiment of the invention.

FIG. 1 illustrates an encapsulated battery system 100. The system 100 includes a power source 102 having a set of power terminals 103-1 and 103-2. In this embodiment, the power source 102 is a battery, by way of example only, a button or cylindrical type battery such as, but not limited to, a lithium cell battery. The power source 102 can also be a disposable battery or a rechargeable battery. In this example, power terminal 103-1 is the positively charged electrode of the battery or anode, while power terminal 103-2 is the negatively charged electrode of the battery or cathode. However, the power terminals can be reversed in alternate embodiments. Furthermore, the power terminals do not have to be located on opposite sides of the battery as illustrated in FIG. 1 but rather can be located in other locations on the battery.

As further shown in the system 100 of FIG. 1, a cover 104 encapsulates the power source 102 as well as the set of power terminals 103-1 and 103-2, thus sealing the power source 102 and the set of power terminals 103-1 and 103-2 within the cover 104. In one embodiment, the material used for the cover 104 to encapsulate and seal the power source 102 and the set of power terminals 103-1 and 103-2 is a natural elastomer such as natural rubber or other natural polymer. In another embodiment, the cover material is a synthetic elastomer such as a synthetic rubber or other synthetic polymer. For example, the material is a rubber material or silicone gel material in certain illustrative embodiments. Some of the advantages of elastomer materials include, but are not limited to, prevention of leakage of the battery chemicals into nature when they are thrown away instead of being recycled, as well as when they are ingested by a human or animal.

The cover 104 can also be formed with a silk material that can be ingested without harm to the human or animal that ingests it. As is known, silk can be processed into various forms such as gels and films. As such, a gel or film-like silk material can be used to encapsulate and seal the power source 102 and the set of power terminals 103-1 and 103-2.

Still further, the cover can be formed with an electrical conducting material that is harmless if swallowed by humans or animals, e.g., gold, platinum or silver. In this case, the cover 104 could also have insulating material surrounding the power terminals 103-1 and 103-2 of the power source 102 or otherwise electrically separating the two terminals to prevent shorting of the anode and the cathode.

As further shown in the system 100 of FIG. 1, a set of conductive contacts 106-1 and 106-2 are configured to pass through the cover 104 and contact the set of power terminals 103-1 and 103-2, respectively, thus providing conductive access to the set of power terminals of the power source 102 from outside the cover without allowing exposure of the power source or the power terminals to an environment outside the cover 104. This means that none of the harmful chemicals of the power source 102 are able to escape from the cover 104 when the power source leaks.

Note that the set of conductive contacts are made of an electrical conducting material, and are configured to be removable from the cover 104 without allowing exposure of the power source 102 or the set of power terminals 103-1 and 103-2 to the outside environment. In the embodiment shown in FIG. 1, the conductive contacts 106-1 and 106-2 are pin-shaped (but can be pointed in shape in some other manner) such that they penetrate the cover 104 but allow the cover to re-seal upon removal of one or more of the contacts. While two pin-shaped structures for each conductive contact are shown penetrating the cover 104 and contacting each of the power terminals (103-1 and 103-2), it is to be understood that more or less pin-shaped structures can be used to form each conductive contact. While the set of conductive contacts 106-1 and 106-2 are preferably removable from the system 100, in an alternative embodiment, the conductive contacts are integrally-formed with the cover 104.

Figure 2:
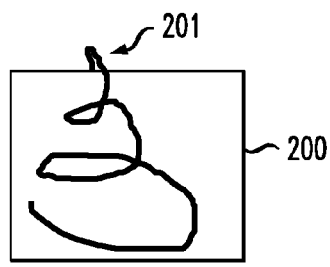
FIG. 2 illustrates a conductive contact for an encapsulated battery system, according to an embodiment of the invention.

FIG. 2 illustrates a conductive contact for an encapsulated battery system, according to an embodiment of the invention. Recall that the system 100 of FIG. 1 illustrates a set of conductive contacts 106-1 and 106-2 that are pin-shaped in form. In an alternate embodiment of a conductive contact 200 shown in FIG. 2, the conductive contact also includes an electrically conductive spring 201 in the form of an adjustable spiral structure. The spring 201 allows for compressive pressure to be put on the conductive contact and the corresponding power terminal (103-1 or 103-2) of the power source 102 in order to make a better electrical connection between the conductive contact 200 and the corresponding power terminal of the power source. The spring 201 is also configured to be able to penetrate the cover 104, if needed for a given configuration, without exposing the power source or power terminals to the outside environment, both while installed and after being removed from the cover.

Figure 3:
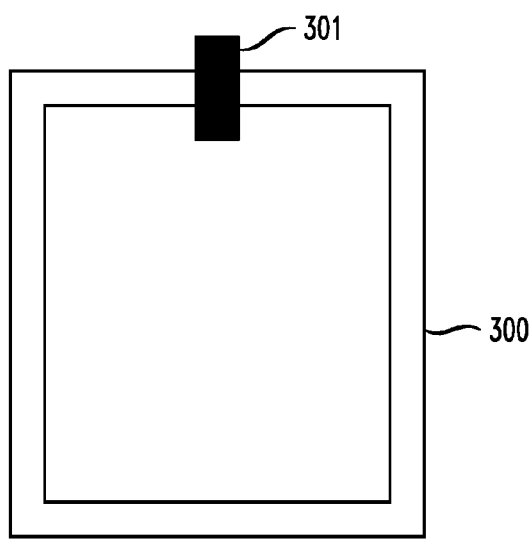
FIG. 3 illustrates an encapsulation structure for an encapsulated battery system, according to an embodiment of the invention.

FIG. 3 illustrates an encapsulation structure for an encapsulated battery system, according to an embodiment of the invention. Recall that the system 100 of FIG. 1 illustrates a cover 104 that encapsulates the power source 102 as well as the set of power terminals 103-1 and 103-2, thus sealing the power source 102 and the set of power terminals 103-1 and 103-2 within the cover. In one embodiment, a cover 300 is shown in FIG. 3. As mentioned, the cover can be made of various materials including, in one or more embodiments, a rubber material that encapsulates the power source and power terminals so as to seal the power source and power terminals from exposure to the outside environment. In one embodiment as shown in FIG. 3, a tyer 301 is included as part of the cover 300. In this embodiment, the tyer 301 is an integral part of the cover structure that securely attaches the cover 300 to the power source. The tyer 301, in one example, is made from the same rubber material as the cover with adhesive material on the portion of the tyer that comes into contact with the body of the power source. Other tyer configurations are possible within the scope of alternate embodiment. Whether or not the cover includes a tyer structure, it is to be appreciated that the power source and power terminals remain sealed from exposure to the outside environment once the power source is encapsulated within the cover.

FIG. 4 illustrates a methodology for forming and installing an encapsulated battery system, according to an embodiment of the invention. As shown in a methodology 400, a battery (one example of a power source and its power terminals) is encapsulated in a rubber cover, in step 402. One of ordinary skill in the art will realize various known rubber application processes for encapsulating and sealing a component such as a battery. It is assumed the conductive contacts (e.g., contacts such as shown as 200 in FIG. 2) are installed by pressing the pin structures of the contact through the rubber cover in the vicinity of the power terminals of the battery. In step 404, the contacts (pins) are adjusted to place the encapsulated battery in a compartment. The compartment may be, for example, the battery compartment of an electronic device that requires battery power for operation. In step 406, the encapsulated battery is placed in the compartment. It is to be understood that when the conductive contacts each include a spring (201 in FIG. 2), the springs are compressed on each side of the battery (e.g., contacts are compressed between the fingers of the installer) so that the encapsulated battery can fit into the compartment. In step 408, the contacts (pins) are released so that the contacts respectively connect with the electrical contacts of the electronic device (located inside the compartment). In step 410, a check is made to verify that the battery is properly installed and sufficiently contacting the contacts of the electronic device. This may be verified by checking whether or not current is flowing through the battery, i.e., check to see that the electronic device is getting the power it needs to operate. If yes, then the methodology ends at block 412. However, if the electronic device is not getting the needed power from the battery, in step 414, the encapsulated battery is removed and the penetration of the pins of the conductive contacts is increased through the rubber cover. This is to ensure that there is more sufficient contact between the conductive contacts and the power terminals of the battery sealed inside the rubber cover. Once this is done, the methodology 400 returns to step 404 and repeats.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:
   a power source having a set of power terminals;
   a cover encapsulating the power source including the set of power terminals and sealing the power source including the set of power terminals within the cover; and
   a set of conductive contacts passing through the cover, contacting the set of power terminals, and providing conductive access to the set of power terminals of the power source from outside the cover without allowing exposure of the power source to an environment outside the cover;
   wherein the set of conductive contacts are removable from the cover without allowing exposure of the power source to an environment outside the cover; and
   wherein the cover is configured to re-seal upon removal of one or more of the set of conductive contacts.

2. The system of claim 1, wherein the cover is at least partially formed of a natural elastomer.

3. The system of claim 1, wherein the cover is at least partially formed of a synthetic elastomer.

4. The system of claim 1, wherein the cover is at least partially formed of a conductive material.

5. The system of claim 4, wherein the conductive material comprises a conductive material that is substantially non-harmful when ingested.

6. The system of claim 1, wherein the power source comprises at least one battery.

7. The system of claim 6, wherein the battery comprises a disposable battery.

8. The system of claim 6, wherein the battery comprises a rechargeable battery.

9. The system of claim 1, wherein one or more of the conductive contacts are pin-shaped.

10. The system of claim 1, wherein one or more of the conductive contacts comprise an electrically conductive spring.

11. An apparatus comprising:
    a battery having positive and negative power terminals;
    a rubber cover encapsulating the battery including the positive and negative power terminals and sealing the battery including the positive and negative power terminals within the cover; and
    a set of conductive contacts passing through the rubber cover, contacting the positive and negative power terminals, and providing conductive access to the positive and negative power terminals of the battery from outside the rubber cover without allowing exposure of the battery to an environment outside the cover;
    wherein the set of conductive contacts are removable from the rubber cover without allowing exposure of the battery to an environment outside the cover; and
    wherein the rubber cover is configured to re-seal upon removal of one or more of the set of conductive contacts.

12. The apparatus of claim 11, wherein the rubber cover comprises a material that is substantially non-harmful when ingested.

13. The apparatus of claim 11, wherein the battery comprises a disposable battery.

14. The apparatus of claim 11, wherein the battery comprises a rechargeable battery.

15. The apparatus of claim 11, wherein one or more of the conductive contacts are pin-shaped.

16. The apparatus of claim 11, wherein one or more of the conductive contacts comprise an electrically conductive spring.

* * * * *